United States Patent
Kanno et al.

(10) Patent No.: US 7,175,490 B2
(45) Date of Patent: Feb. 13, 2007

(54) BOAT INDICATOR

(75) Inventors: Isano Kanno, Hamamatsu (JP); Masaru Kawanishi, Hamamatsu (JP)

(73) Assignee: Yamaha Marine Kabushiki Kaisha, Shizuoka-ken (JP)

( * ) Notice: Subject to any disclaimer, the term of this patent is extended or adjusted under 35 U.S.C. 154(b) by 108 days.

(21) Appl. No.: 10/967,984

(22) Filed: Oct. 19, 2004

(65) Prior Publication Data
US 2005/0118895 A1 Jun. 2, 2005

(30) Foreign Application Priority Data
Nov. 27, 2003 (JP) ............................. 2003-396639

(51) Int. Cl.
- B63B 49/00 (2006.01)
- G01D 3/24 (2006.01)
- G01D 7/00 (2006.01)
- G01P 1/07 (2006.01)

(52) U.S. Cl. ............................. 440/2; 440/87; 324/115; 324/166

(58) Field of Classification Search .................... 440/1, 440/2, 84, 87; 324/115, 166
See application file for complete search history.

(56) References Cited

U.S. PATENT DOCUMENTS

| | | | |
|---|---|---|---|
| 4,352,062 A | * | 9/1982 | Nomura et al. ............. 324/169 |
| 4,470,011 A | * | 9/1984 | Masuda ....................... 324/166 |
| 4,836,809 A | | 6/1989 | Pelligrino |
| 6,109,986 A | | 8/2000 | Gaynor et al. |
| 6,215,298 B1 | * | 4/2001 | Westberg et al. ........... 324/166 |

FOREIGN PATENT DOCUMENTS

| | | |
|---|---|---|
| DE | 44 41 745 A1 | 6/1995 |
| JP | 01-102371 | 4/1989 |
| JP | 06-042982 | 2/1994 |
| JP | 09 005 121 | 1/1997 |
| JP | 09-005121 | 1/1997 |
| JP | 09005121 A * | 1/1997 |

OTHER PUBLICATIONS

European Search Report dated Mar. 2, 2005 for EP 04 02 5206.

* cited by examiner

*Primary Examiner*—Ajay Vasudeva
(74) *Attorney, Agent, or Firm*—Knobbe Martens Olson & Bear LLP

(57) ABSTRACT

A boat indicator enables a user to easily read engine speeds for boats which can switch between a low-speed trolling mode and a normal running mode at speeds higher than the trolling mode speed. The boat indicator includes an engine speed indicating section for indicating engine speed. The engine speed indicating section is adapted to switch between a normal mode display for indicating the engine speed over a relatively large range when the boat is in the normal mode and a trolling mode display for indicating engine speed over a relatively small, low-speed range when the boat is in the trolling mode. The normal mode display indicates engine speed detected with a first resolution over the large range. The trolling mode display indicates engine speed detected with a second resolution finer than the first resolution over the smaller range.

6 Claims, 6 Drawing Sheets

BOAT INDICATOR

CROSS REFERENCE TO RELATED APPLICATIONS

This application is based on and claims priority to Japanese Patent Application No. 2003-396639, filed Nov. 27, 2003, the entire content of which is hereby expressly incorporated herein by reference.

BACKGROUND OF THE INVENTION

1. Field of the Invention

This invention relates to a boat indicator that includes an engine speed indicating section for indicating the engine speed of a boat, which can switch a running mode between a normal mode and a low-speed trolling mode.

2. Description of the Related Art

A conventional boat having an outboard motor or the like has a boat indicator for indicating engine speed. The boat indicator can indicate engine speeds of approximately 100 rpm or higher with a low display resolution in order to enable a user to read the engine speed at a glance.

When the engine speed is set for running in a trolling mode, the setting of the engine speed covers more precise preset values compared to the values that can be indicated by the display resolution of a conventional boat indicator. However, the conventional indicator has a fixed display resolution which can only indicate engine speed equal to or higher than approximately 100 rpm. Thus, when the engine speed is set for trolling, a user will have difficulty identifying whether the engine speed shown by the indicator is close to a desired preset engine speed.

In contrast to the conventional indicator, JP-A-H9-5121 discloses a tachometer for a motorcycle in which engine speed is indicated by a display resolution higher than the normal display when predetermined conditions are met. For example, if the engine speed becomes equal to or lower than a predetermined value, the display mode can be changed to a detailed display. For example, the more detailed display enables a user to know more precise values when the user is adjusting the idling engine speed of the motorcycle engine.

SUMMARY OF THE INVENTION

In JP-A-H9-5121, a segment display section is provided in addition to a bar display section. This segment display section provides more detailed data of engine speed compared to the bar display provided that the engine speed becomes equal to or lower than a predetermined value. Otherwise, the segment display section provides the velocity of the motorcycle rather than the engine speed. Because the display section may be displaying engine speed at one time and velocity at another time, a user may have difficulty in instantly identifying whether the segment display section indicates the engine speed or the velocity. The trolling mode used while fishing is unique to boats. JP-A-H9-5121 does not disclose or suggest two modes equivalent to the running mode and the trolling mode of a boat, which provides a generally constant low engine speed that is useful for fishing.

The boat indicator disclosed herein enables a user to easily read engine speeds at a first resolution when the engine speeds for a boat operated in the normal mode are relatively high and to read engine speeds which are more precisely indicated when the engine speeds are relative low for a boat operated in a trolling mode.

One aspect of embodiments in accordance with the present invention is a boat indicator that comprises an engine speed indicating section for indicating engine speed. The boat indicator is used for boats which can switch a running mode between a low-speed trolling mode and a normal mode at a speed higher than the trolling mode. The engine speed indicating section is adapted to switch display modes according to the running mode selection. In particular, the engine speed indicating section switches between the normal mode display for indicating the engine speed in the normal mode and the trolling mode display for indicating engine speed in the trolling mode. The normal mode display indicates engine speed detected with a first resolution over a first speed range. In contrast, the trolling mode display indicates engine speed detected with a second resolution over a lower speed range than the speed range of the first resolution.

Preferably, an engine condition indicating section is located next to the engine speed indicating section. The engine condition indicating section is adapted to switch display modes according to the running mode selection. In particular, the engine condition indicating section switches between a normal mode display when the engine is in the normal mode and a trolling mode display when the engine is in the trolling mode. In the normal mode display, the engine condition indicating section indicates cooling water temperature, residual battery capacity, and the like. In the trolling mode display, the engine condition indicating section indicates that the trolling mode is currently selected and indicates the preset trolling engine speed.

Preferably, the boat indicator further comprises a mode selection switch for switching the running mode between the trolling mode and the normal mode.

In certain embodiments, the boat indicator further comprises an engine-speed changing switch for changing a preset trolling engine speed in the trolling mode.

BRIEF DESCRIPTION OF THE DRAWINGS

The foregoing features and other features of embodiments in accordance with the present invention are described below in connection with the drawings in which.

DETAILED DESCRIPTION OF THE PREFERRED EMBODIMENTS

Figure 1:
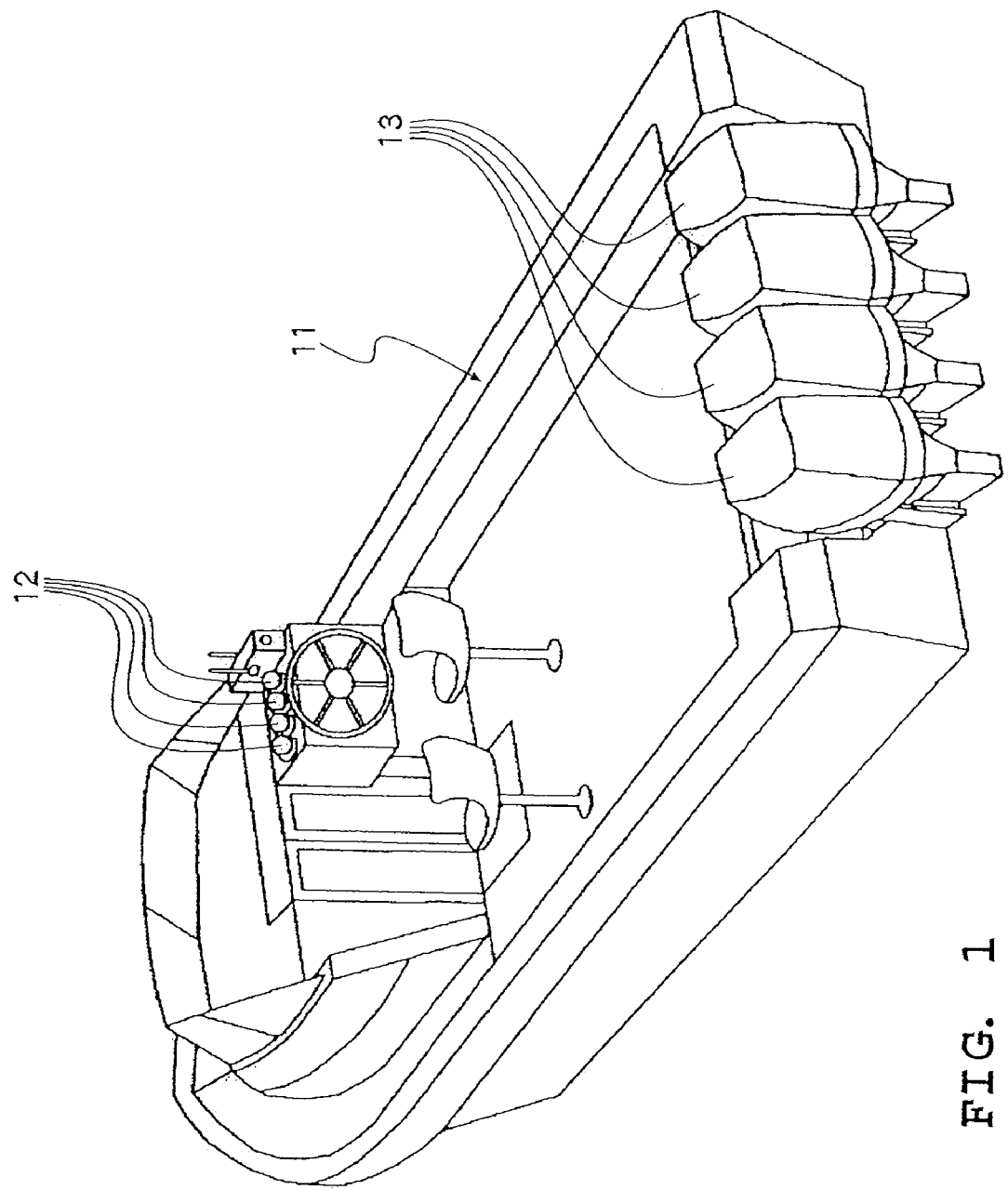
FIG. 1 illustrates a perspective view of a boat into which embodiments in accordance with the present invention are advantageously incorporated.

As shown in FIG. 1, a boat includes a hull 11. A plurality of indicators (e.g., four indicators) 12 are disposed in front of a driver's seat on the hull 11. A corresponding plurality of outboard motors (e.g., four outboard motors) 13 are mounted on the rear of the hull 11. The plurality of outboard motors 13 and indicators 12 communicate with each other via a Local Area Network (LAN), which is not shown in the figures but which is well-known to one skilled in the art.

Figure 3:
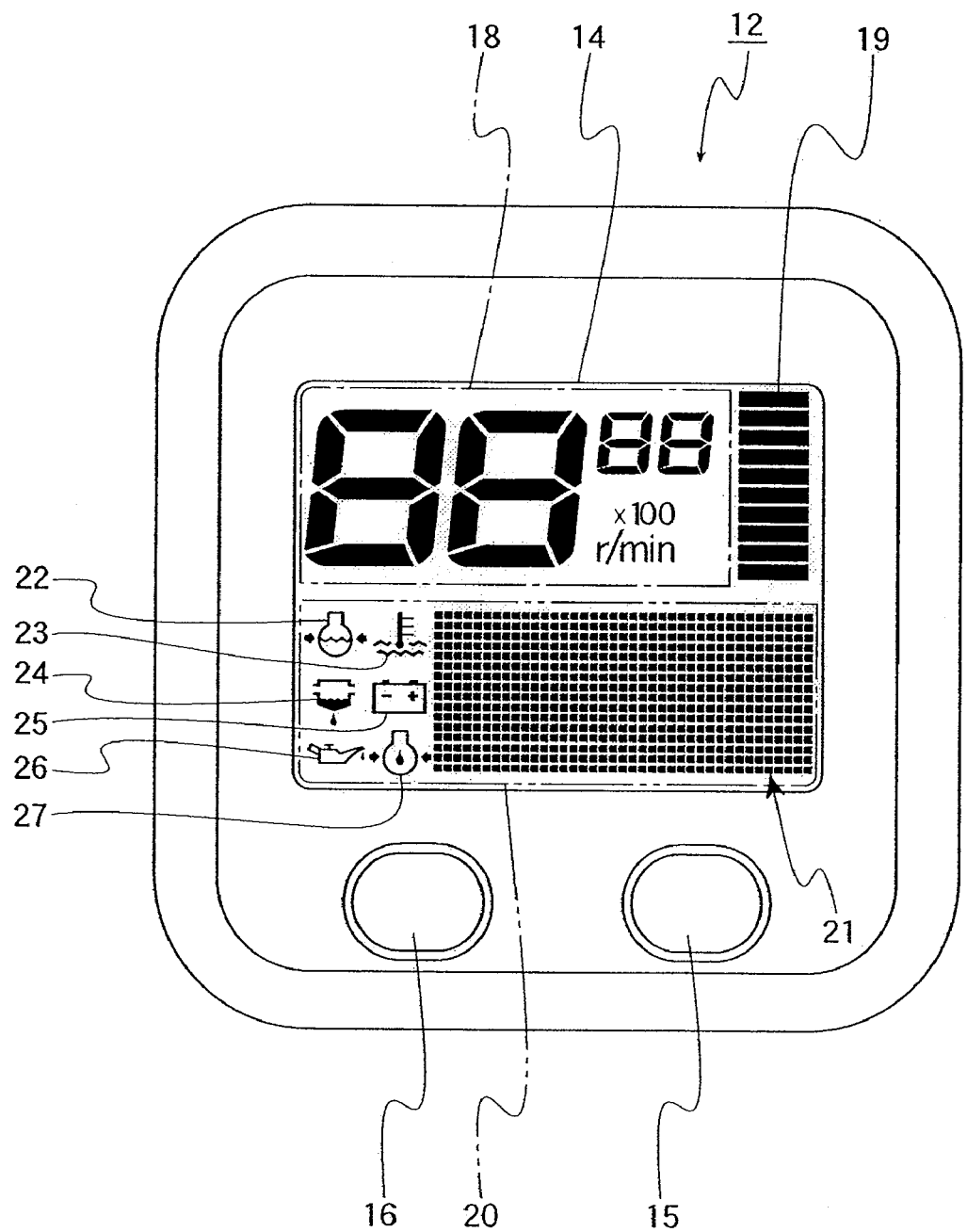
FIG. 3 illustrates a front view of the indicator according to the embodiment of FIG. 2.

As shown in FIG. 3, each indicator 12 is provided with an indicating section 14 for indicating various data, such as engine speed and cooling water temperature. A mode selection switch 15 and a setting switch 16 are located below the indicating section 14. The mode selection switch 15 enables a user to switch the running mode between low-speed trolling mode and normal mode at a speed higher than the trolling mode. The mode selection switch 15 and the setting switch 16 also enable the user to change the preset trolling engine speed. The two switches 15, 16 are referred to as "engine-speed changing switches."

Figure 2:
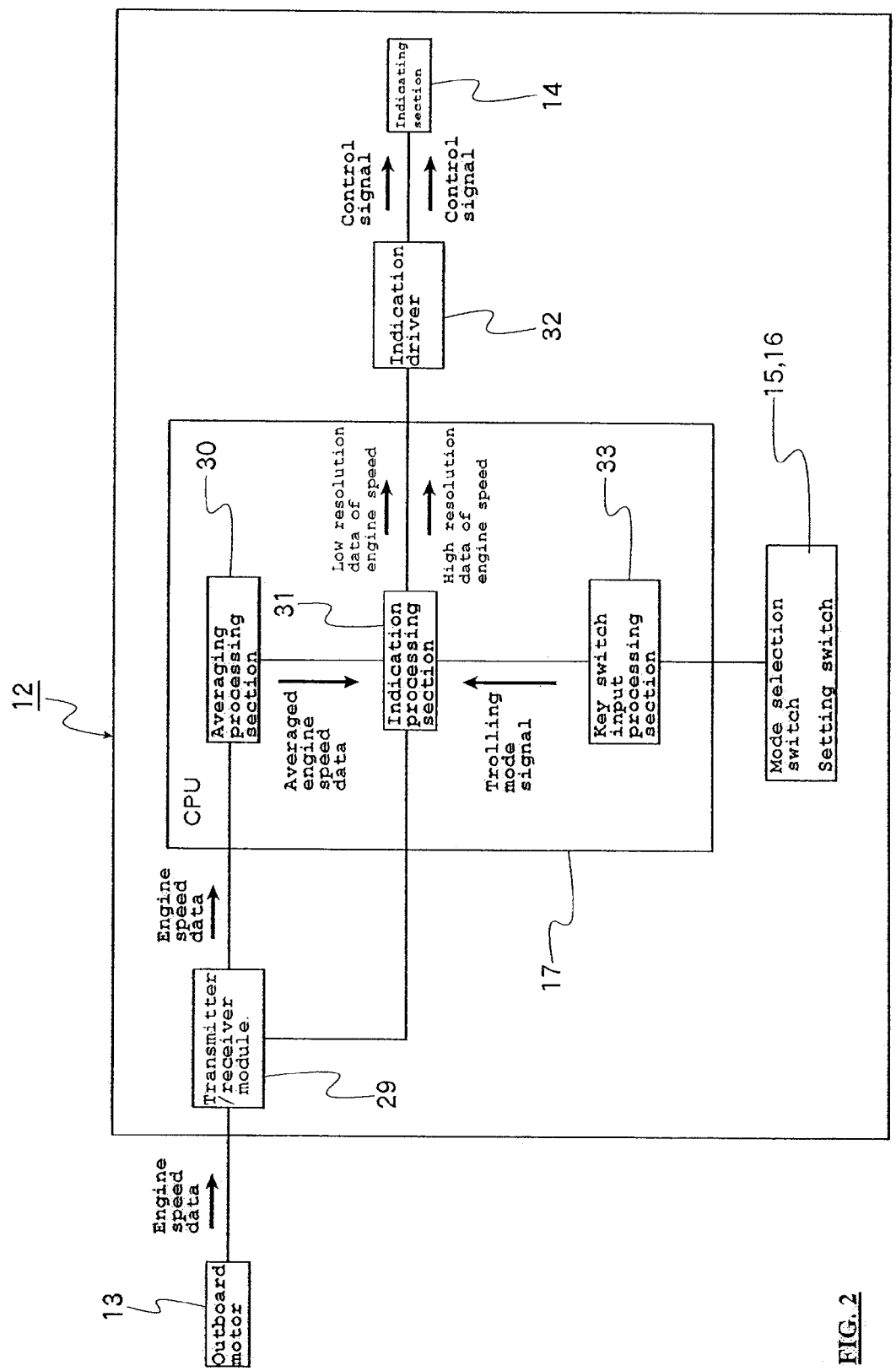
FIG. 2 illustrates a block diagram of an embodiment of an indicator in accordance with the present invention.

As shown in FIG. 2, the indicating section 14 and the switches 15, 16 are connected to and controlled by a central processing unit (CPU) 17, which will be described below.

The indicating section 14 of each indicator comprises an engine speed indicating section 18 for indicating engine speed of the respective outboard motor 13, a trim position indicating section 19 for indicating a trim position of the respective outboard motor 13, and an engine condition indicating section 20 for indicating the state of the trolling mode and cooling water temperature, etc., for the respective outboard motor 13.

The user operates the indicator 12 by pressing the mode selection switch 15 for a predetermined period of time (e.g., 1.5 seconds), which causes a mode selection signal to be transmitted to the outboard motor 13 through the CPU 17 to set the running mode of the outboard motor 13 at the low-speed trolling mode. The user may keep pressing the mode selection switch 15 to cause a mode selection signal to be transmitted to the outboard motor 13 through the CPU 17 to switch the trolling mode to normal mode for higher-speed running.

When the outboard motor 13 is in the trolling mode, the engine speed of the outboard motor 13 is adjusted, for example, by controlling an idle speed control (ISC) valve (not shown).

Figure 4:
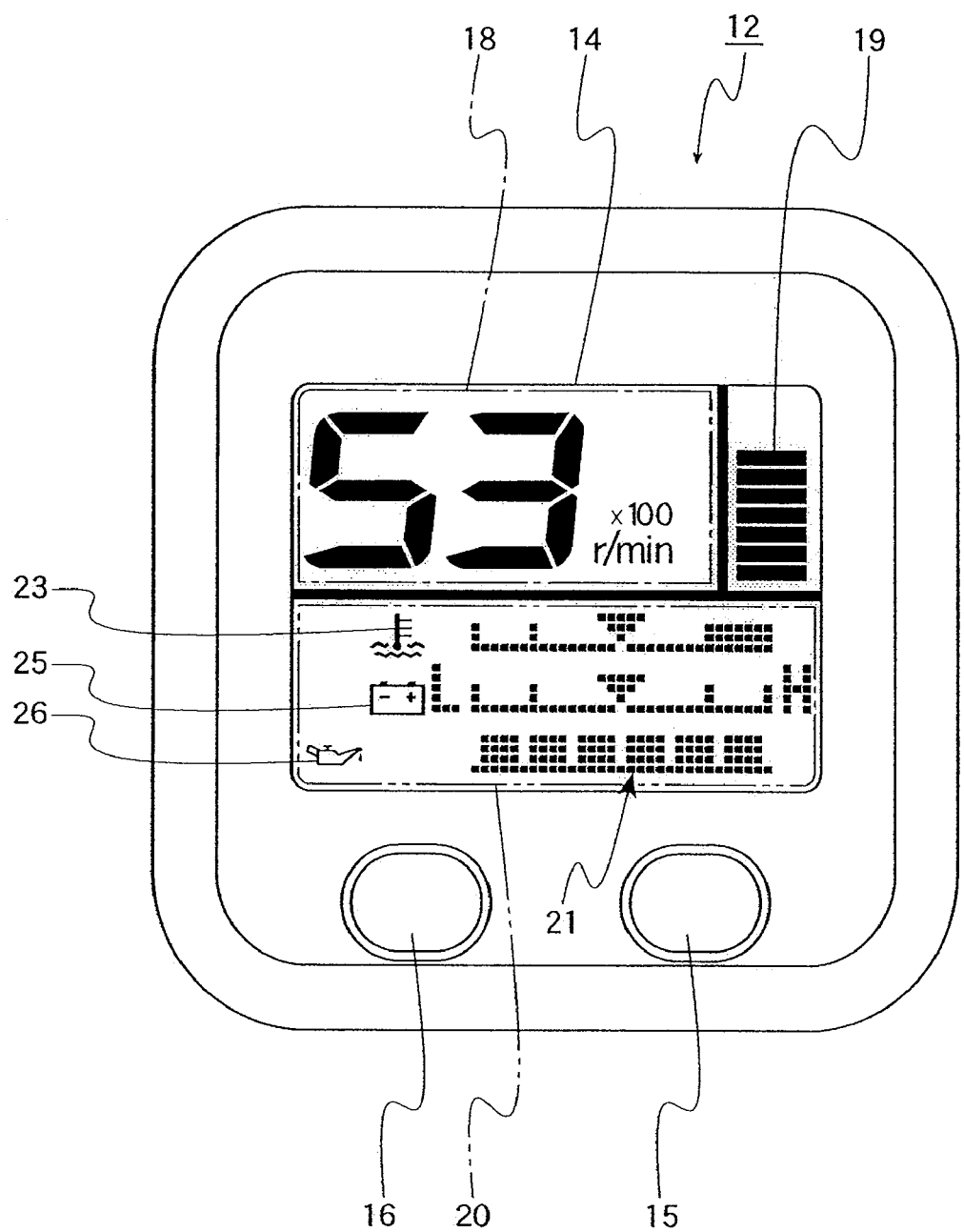
FIG. 4 illustrates a front view of the indicator of FIG. 3 with the display selected for the normal mode.
Figure 5:
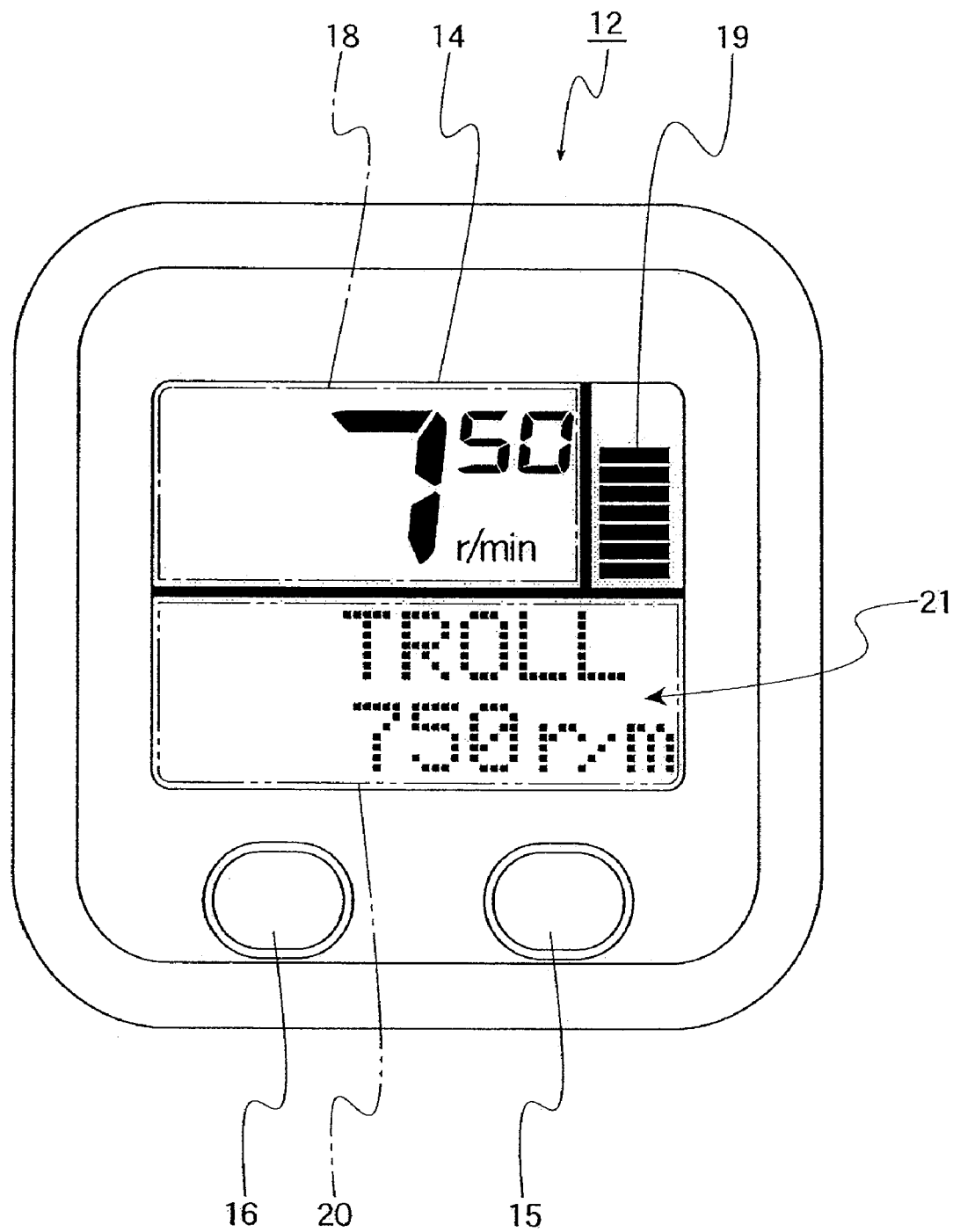
FIG. 5 illustrates a front view of the indicator of FIG. 3 with the display selected for the trolling mode.

The engine speed indicating section 18 is responsive to the running mode selection to switch display modes between the normal mode display for indicating the engine speed in the normal mode (as shown in FIG. 4) and the trolling mode display for indicating the low engine speed in the trolling mode (as shown in FIG. 5).

The normal mode display on the engine speed indicating section 18 indicates engine speed detected with a first resolution (e.g., the value shown represents the engine speeds in increments of 100 rpm). More particularly, the engine speed in revolutions per minute is indicated as a value having a number in a range between 0 and 99 in the hundreds place or in a larger-place value. In the example shown in FIG. 4, the number 53 is in the hundreds place on the display and thus represents an engine speed of 5,300 rpm.

The trolling mode display on the engine speed indicating section 18 indicates the detected engine speed in the lower-speed range with a second resolution that is more precise than the first resolution. In particular, the engine speed in revolutions per minute is indicated as a value having a number in the tens and ones (units) places. In the embodiment illustrated in FIG. 5, the engine speed in the trolling mode is represented by a first two-digit number in the tens and units places and a second number in the hundreds place. For example, with a single digit in the hundreds place, engine speeds in a range between 000 and 999 rpm can be displayed. In the specific example shown in FIG. 5, the digit 7 in the hundreds place and the digits 50 in the units place represents an engine speed of 750 rpm. In the illustrated embodiment, the second resolution represents the engine speed in the trolling mode in increments of 1 rpm.

The trim position indicating section 19 is located next to the engine speed indicating section 18 and is configured to indicate a trim position and a trim tab position at one of the 10 position levels.

As shown in FIG. 3, the engine condition indicating section 20 comprises a multi-indication section 21, which is controlled to display values for various parameters, display levels, and display text. The engine condition indicating section 20 also includes a water pressure mark 22, which is indicated when the water pressure mode is selected. The water pressure mark 22 flashes when an abnormally low cooling water pressure is detected. A water temperature mark 23 is indicated when the water temperature mode is selected. The water temperature mark 23 flashes when an abnormally high water temperature is detected. A water accumulation mark 24 flashes when water accumulation is detected in a fuel filter. A voltage mark 25 is indicated when the electric voltage mode is selected. The voltage mark 25 flashes when an abnormally low battery voltage is detected. An oil amount mark 26 is advantageously included for outboard motors having two-stroke engines. The oil amount mark 26 is indicated when the oil amount mode is selected. The oil amount mark 26 flashes when a condition of a low amount of oil is detected. An oil pressure mark 27 is advantageously included for outboard motors having four-stroke engines. The oil pressure mark 27 is indicated when the oil pressure mode is selected. The oil pressure mark 27 flashes when an abnormally low oil pressure is detected.

The engine condition indicating section 20 is responsive to the running mode selection to switch between the normal mode display and the trolling mode display. When the normal mode display is selected, the engine condition indicating section 20 indicates cooling water temperature, residual battery capacity, and the like. When the trolling mode display is selected, the engine condition indicating section 20 indicates that the trolling mode is currently selected and also indicates the preset trolling engine speed.

In the example shown in FIG. 4, the normal mode display on the engine condition indicating section 20 indicates the water temperature mark 23, the voltage mark 25, and the oil amount mark 26 and displays the cooling water temperature, the residual battery capacity, and the oil amount in the multi-indication section 21.

In the example shown in FIG. 5, the trolling mode display on the multi-indication section 21 of the engine condition indicating section 20 indicates "TROLL" to show that the trolling mode is selected and also indicates "750 r/m" to show that the trolling engine speed is currently set for 750 rpm.

The preset trolling engine speed in trolling mode is configured to be variable so that the preset trolling engine speed is increased by 50 rpm each time a user presses the mode selection switch 15 for a predetermined period of time (e.g., for a period no longer than 1.5 seconds) or is decreased by 50 rpm each time the user presses the setting switch 16 for a predetermined period of time (e.g., no longer than 1.5 seconds).

As illustrated in the block diagram of the indicator 12 in FIG. 2, the engine driving conditions of the outboard motor 13 (e.g., the engine speed) is transmitted as engine speed data from the outboard motor 13 to the indicator 12 via the LAN. The engine speed data is received by a transmitter/receiver module 29 in the indicator 12 and is transferred to an averaging processing section 30 in the CPU 17 in the indicator 12. The averaging processing section 30 generates averaged engine speed data, which is transferred to an indication processing section 31.

In the normal mode, the indication processing section 31 processes the engine speed data at low resolution (e.g., a first resolution). This data is transmitted to an indication driver 32, which outputs a control signal to the indicating section 14. The indicating section 14 is responsive to the control signal to display the engine speed. In the example shown in FIG. 4, the engine speed indicating section 18 in the indicating section 14 indicates "53×100 r/min" to indicate that the current engine speed is 5,300 rpm. Furthermore, as discussed above, the engine condition indicating section 20 indicates the water temperature mark 23, the voltage mark 25, and the oil amount mark 26. The multi-indication section 21 indicates the cooling water temperature, the residual battery capacity, and the oil amount.

In contrast to the foregoing description, when the user operates the mode selection switch 15 to switch to the trolling mode enables, a trolling mode signal is communicated to the indication processing section 31 through a key switch input processing section 33. The indication processing section 31 is responsive to the trolling mode signal to switch to processing at high resolution (e.g., a second resolution). As in the normal mode discussed above, the engine speed data processed at high resolution in the trolling mode is transferred from the indication processing section 31 to the indication driver 32, which outputs a control signal to the indicating section 14.

As shown in FIG. 5, in the trolling mode, the engine speed indicating section 18 in the indicating section 14 indicates "750 r/min" as the current engine speed in response to the control signal from the indication driver 32. In addition, the engine condition indicating section 20 in the indicating section 14 is switched to the trolling mode display and indicates "TROLL 750 r/m" to indicate that the indicator 12 is in the trolling mode and to indicate the current preset speed selected by the user.

In response to the switching operations between the normal mode and the trolling mode, the resolution at which the engine speed data is processed is changed, and the display mode of the engine speed indicating section 18 is switched. The trolling mode display indicates engine speeds lower than those shown on the normal mode display. Based on these indicated values, a driver can appropriately control the lower engine speed in trolling mode. These features of the indicator 12 enable the user to adjust the running speed in trolling mode to a desirable speed, which can lead to more successful fishing.

The engine speed indicating section 18 does not display the velocity of the boat. Rather, the engine speed indicating section 18 displays only the engine speed in the normal mode and in the trolling mode. This consistent operation enables the driver to easily recognize the displayed values as being engine speeds.

As illustrated in FIG. 5, in the trolling mode, the engine speed indicating section 18 displays numbers in the tens and ones (units) places. At normal engine speeds the lowest two-digit number in the tens and ones places changes frequently and thus will only have momentary visibility at each value. The momentary visibility causes the digits to appear to flash and to have low visibility. Because the low visibility and the frequent changes are difficult to read, the lowest two-digit number is not displayed in the normal mode. Thus, in the preferred embodiments, no numbers are displayed in the tens and ones places in the normal mode, as illustrated in FIG. 4.

As discussed above, the engine condition indicating section 20 switches display modes according to the mode selection enabled by the user. In particular the engine condition indicating section 20 switches between the normal mode display in the normal mode and the trolling mode display in the trolling mode. The normal mode display indicates the cooling water temperature, battery residual capacity, and the like. The trolling mode display indicates that the trolling mode is currently selected and the preset trolling engine speed in trolling mode. When the user (e.g., the driver) views the information displayed in the engine condition indicating section 20, the driver is able to easily recognize the current mode. In addition, the indicated preset trolling engine speed enables the driver to easily recognize the current preset engine speed. The driver is able to easily compare the current preset engine speed shown in the engine condition indicating section 20 with the actual engine speed shown in the engine speed indicating section 18 and determine whether the engine is operating at the preset value.

The mode selection switch 15 on the indicator 12 enables the driver to easily switch the running mode between the trolling mode and the normal mode while viewing the indicating section 14.

The setting switch 16 on the indicator 12 is used with the mode selection switch in the trolling mode to enable the driver to easily change the preset trolling engine speed while viewing the indicating section 14. For example, the preset trolling engine speed is readily changed as required by circumstances, such as wave conditions, wind conditions, and the type of target fish.

Figure 6:
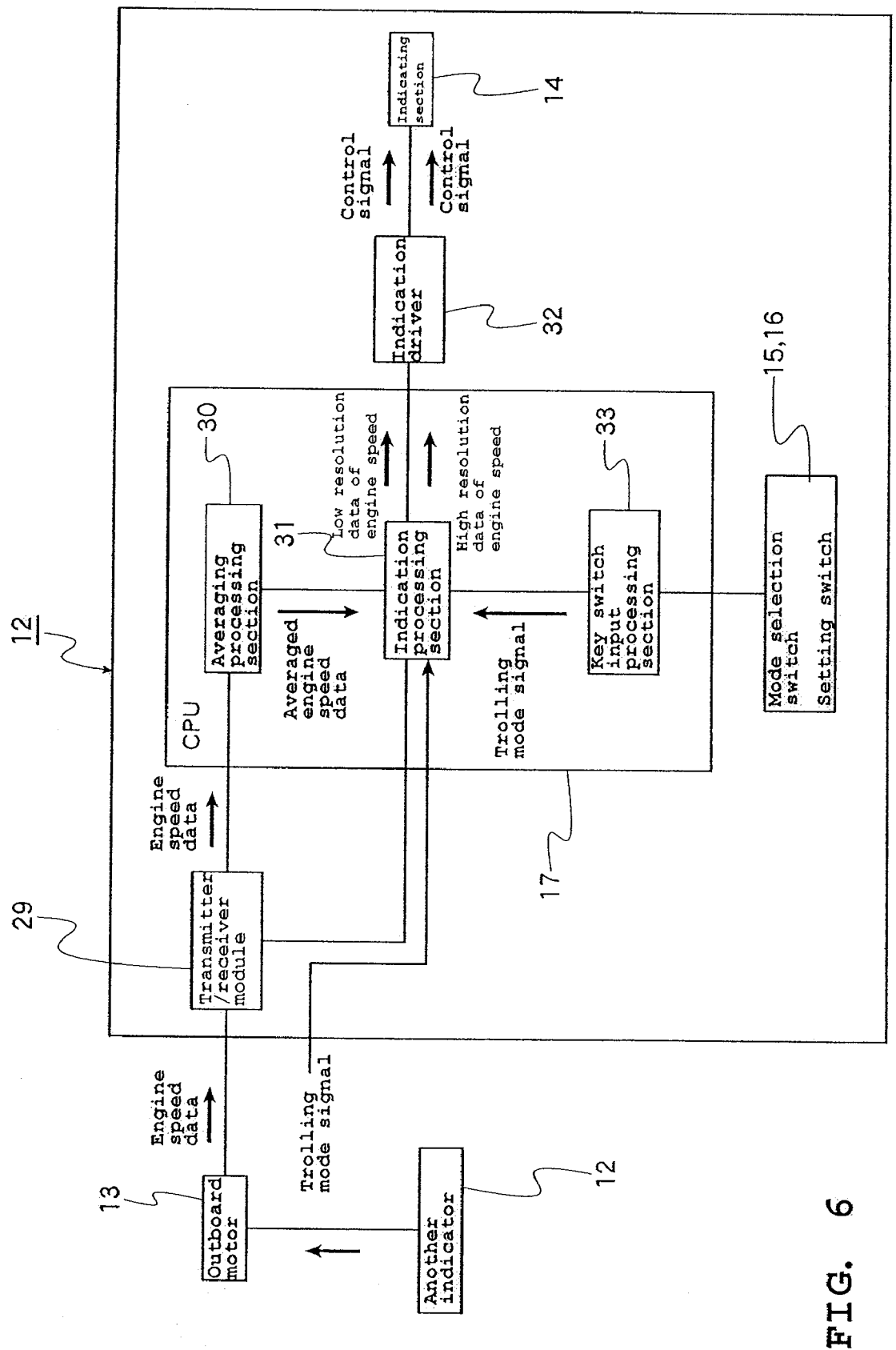
FIG. 6 illustrates a block diagram equivalent to FIG. 2 for a modified embodiment of the indicator.

In another embodiment illustrated by the block diagram in FIG. 6, multiple outboard motors 13 and corresponding multiple indicators 12 are controlled together via the LAN. In particular, setting one of the indicators 12 for one of the outboard motors 13 to trolling mode causes the other indicators 12 to also be set to trolling mode, which causes results all of the indicators 12 to switch to the lower speed range with the more precise display resolution display. In the embodiment of FIG. 6, operating one of the mode selection switch 15 of one of the indicators 12 causes all the other indicators 12 and outboard motors 13 to be set to trolling mode, thereby substantially improving the operability.

As described above, the engine speed indicating section is adapted to switch display modes according to the running mode selected for the engine. In particular, the engine speed indicating section switches between the normal mode display for indicating the engine speed in normal mode and the trolling mode display for indicating engine speed in trolling mode. The normal mode display indicates engine speed detected with a first resolution over a first speed range, and the trolling mode display indicates engine speed detected with a second resolution over a lower speed range than the first speed range. The second resolution is a more precise resolution than the first resolution. In the trolling mode display, the preset value of the engine speed is displayed. This allows a driver to identify whether the engine speed shown by the indicator is close to the preset engine speed. The engine speed indicating section does not display velocities and other speed information. Rather, the engine speed indicating section displays only engine speeds in the normal mode and in the trolling mode. The characteristics of the two display modes enable the driver to easily recognize the current operating mode of the display and of the engine.

As further described above, the engine condition indicating section is located next to the engine speed indicating section. The engine condition indicating section is adapted to switch display modes according to the running mode of the engine. In particular, the engine condition indicating section switches to the normal mode display in the normal mode and indicates the cooling water temperature, battery residual capacity and the like. The engine condition indicating section switches to the trolling mode display in the trolling mode and indicates that the trolling mode is currently selected and also indicates the preset trolling engine speed. The driver is able to view the displays and easily recognize the current mode of operation of the engine. In addition, the preset trolling engine speed displayed in the trolling mode display enables the driver to easily recognize the current preset engine speed and compare this current preset engine speed with the actual engine speed so that the driver is able to determine whether the engine is operating at the preset value.

As described above, the mode selection switch on the indicator is used to switch the running mode between the trolling mode and the normal mode. The driver is able to easily switch the running mode using this switch while viewing the indicating section.

As described above, the boat indicator further includes an engine-speed changing switch, in order to change the preset trolling engine speed in the trolling mode. The driver is able to easily change the preset trolling engine speed using the engine-speed changing switch while viewing the indicating section. Thus, the driver can adjust the engine speed to a required value depending on current conditions, such as, for example, wave conditions, wind conditions, and the type of target fish.

Aspects of the present invention may be embodied in other specific forms without departing from the essential characteristics as described herein. The embodiments described above are to be considered in all respects as illustrative only and not restrictive in any manner. The scope of the invention is indicated by the following claims rather than by the foregoing description. Any and all changes which come within the meaning and range of equivalency of the claims are to be considered within their scope.

What is claimed is:

1. A boat indicator for a boat which can switch a running mode of an engine between a low-speed trolling mode and a higher-speed normal mode, the boat indicator comprising:
    an engine speed indicating section that indicates the engine speed of the engine, the engine speed indicating section adapted to switch display modes in accordance with the running mode of the engine, the display modes comprising:
        a normal mode display, which is enabled when the running mode of the engine is switched to the normal mode, the normal mode display indicating the engine speed at a first resolution in a first range of engine speeds; and
        a trolling mode display, which is enabled when the running mode of the engine is switched to the trolling mode, the normal mode display indicating the engine speed at a second resolution in second range of engine speeds, the second range of engine speeds smaller than the first range of engine speeds, the second resolution being more precise than the first resolution; and
    an engine condition indicating section located next to the engine speed indicating section, the engine condition indicating section adapted to switch display modes in accordance with the running mode of the engine, engine condition indicating section including:
        a normal mode display enabled when the running mode of the engine is switched to the normal mode, the normal mode display of the engine condition indicating section indicating at least a cooling water temperature and a residual battery capacity; and
        a trolling mode display enabled when the running mode of the engine is switched to the trolling mode, the trolling mode display of the engine condition indicating section comprising:
            a first display portion that indicates that the trolling mode is currently selected; and
            a second display portion that indicates a preset trolling engine speed.

2. The boat indicator according to claim 1, further comprising a mode selection switch for switching the running mode of the engine between the trolling mode and the normal mode.

3. The boat indicator according to claim 2, further comprising an engine-speed changing switch for changing the preset trolling engine speed in the trolling mode.

4. The boat indicator according to claim 1, further comprising an engine-speed changing switch for changing the preset trolling engine speed in the trolling mode.

5. A boat indicator for a boat which can switch a running mode of an engine between a low-speed trolling mode and a higher-speed normal mode, the boat indicator comprising:
    an engine speed indicating section that indicates the engine speed of the engine, the engine speed indicating section adapted to switch display modes in accordance with the running mode of the engine, the display modes comprising:
        a normal mode display, which is enabled when the running mode of the engine is switched to the normal mode, the normal mode display indicating the engine speed at a first resolution in a first range of engine speeds; and
        a trolling mode display, which is enabled when the running mode of the engine is switched to the trolling mode, the normal mode display indicating the engine speed at a second resolution in second range of engine speeds, the second range of engine speeds smaller than the first range of engine speeds, the second resolution being more precise than the first resolution; and
    a mode selection switch for switching the running mode of the engine between the trolling mode and the normal mode.

6. A boat indicator for a boat which can switch a running mode of an engine between a low-speed trolling mode and a higher-speed normal mode, the boat indicator comprising:
    an engine speed indicating section that indicates the engine speed of the engine, the engine speed indicating section adapted to switch display modes in accordance with the running mode of the engine, the display modes comprising:
        a normal mode display, which is enabled when the running mode of the engine is switched to the normal mode, the normal mode display indicating the engine speed at a first resolution in a first range of engine speeds; and
        a trolling mode display, which is enabled when the running mode of the engine is switched to the trolling mode, the normal mode display indicating the engine speed at a second resolution in second range of engine speeds, the second range of engine speeds smaller than the first range of engine speeds, the second resolution being more precise than the first resolution; and
    an engine-speed changing switch for changing a preset trolling engine speed in the trolling mode.

* * * * *